United States Patent [19]

Harrah

[11] Patent Number: 5,207,754
[45] Date of Patent: May 4, 1993

[54] QUICK-RELEASE CONNECTOR FOR MOP HANDLES AND THE LIKE

[75] Inventor: David W. Harrah, DeSoto, Kans.

[73] Assignee: FLC, Inc., Lenexa, Kans.

[21] Appl. No.: 648,018

[22] Filed: Jan. 30, 1991

[51] Int. Cl.⁵ .................................. A47L 13/24
[52] U.S. Cl. .................... 15/147.1; 15/229.1; 15/147.2; 24/625
[58] Field of Search .............. 15/147 R, 229.1, 228, 15/147 A; 24/230, 615, 625; 403/121

[56] References Cited

U.S. PATENT DOCUMENTS

| | | | |
|---|---|---|---|
| 1,420,639 | 6/1922 | Sturgis | 15/147.2 |
| 3,145,406 | 8/1964 | Lay | 15/229.2 |
| 3,432,873 | 3/1969 | Moss | 15/229.2 |
| 3,639,950 | 2/1972 | Lutz et al. | 24/230 |
| 3,795,934 | 3/1974 | Moss | 15/229.2 |
| 4,150,464 | 4/1979 | Tracy | 24/77 R |
| 4,171,555 | 10/1979 | Bakker et al. | 24/200 |
| 4,306,326 | 12/1981 | Kim | 15/105 |
| 4,433,931 | 2/1984 | Malish et al. | 403/194 |
| 4,648,738 | 3/1987 | Thielen | 403/341 |
| 4,825,515 | 5/1989 | Wolterstoff, Jr. | 24/615 |
| 4,831,694 | 5/1989 | Kong | 24/615 |

FOREIGN PATENT DOCUMENTS 200733 7/1923 United Kingdom ........... 15/229.1
626918 7/1949 United Kingdom ........... 15/229.1

Primary Examiner—Philip R. Coe
Assistant Examiner—Patrick F. Brinson
Attorney, Agent, or Firm—Kenneth W. Iles

[57] ABSTRACT

A quick-release connector for connecting a handle to a mop head or the like comprises a first section for attachment to the handle and a second section for attachment to the mop head. The first section has a plurality of receptacles which mate with a similar plurality of bayonet projections in the second section. At least one of the bayonet projections is resiliently flexible and flexes outward when the first and second sections are pushed together so as to mate with and be securely gripped by an indentation in the first section providing a positive interlock between the sections. Another of the bayonet projections is a rigid, longer bayonet which acts as a guide when the two sections are connected together. The first section also has a polygon-shaped, shallow recess which mates with a similar polygon-shaped protrusion in the second section when the two sections are pushed together to provide resistance to torsional stress. The connector can be attached to a mop head or fitted with a male threaded rod for attachment to a broom handle, paint roller, or the like.

6 Claims, 2 Drawing Sheets

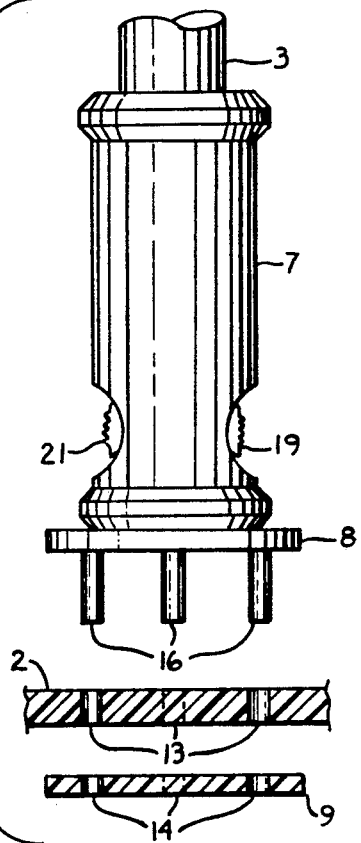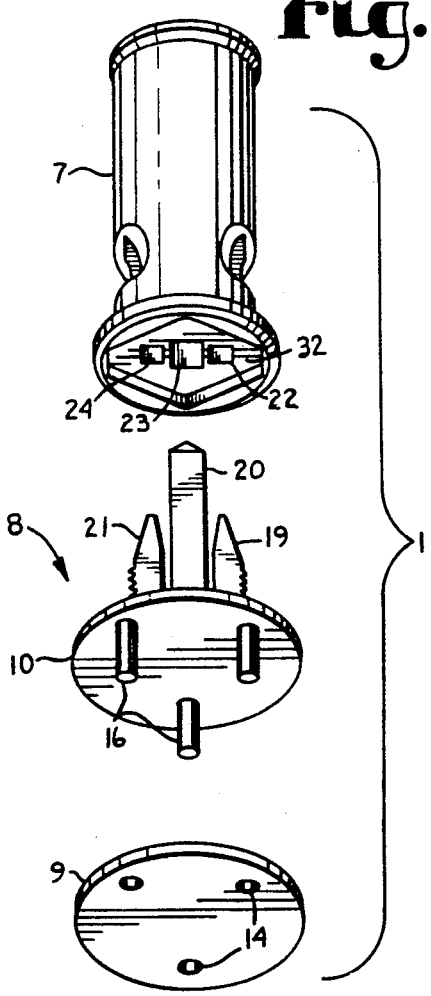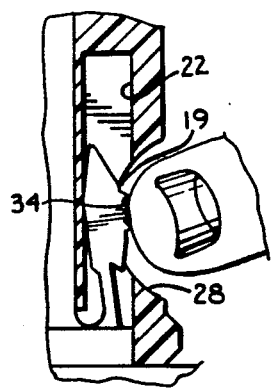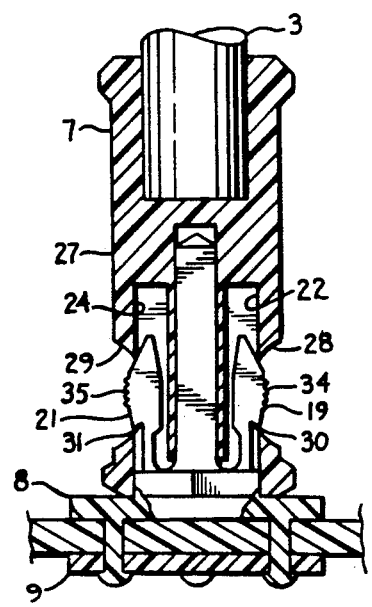

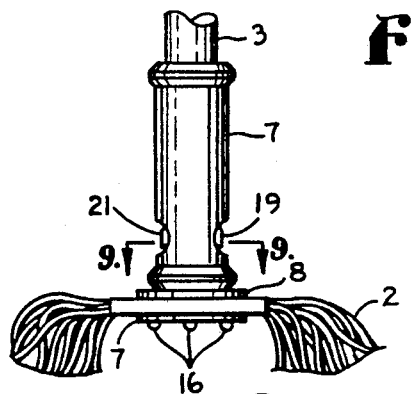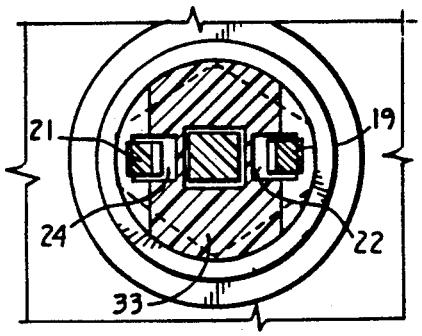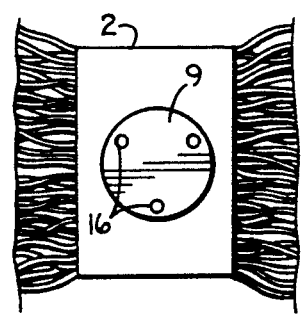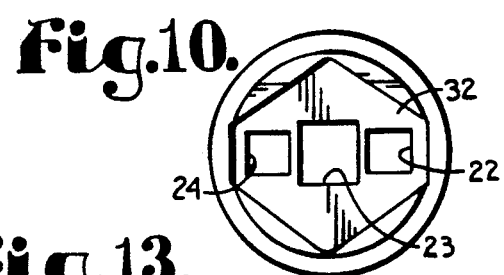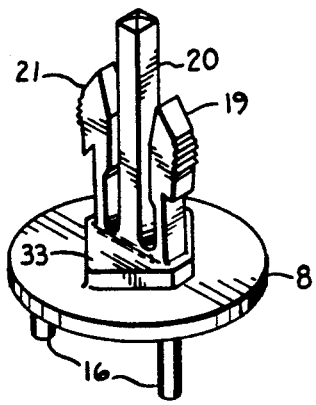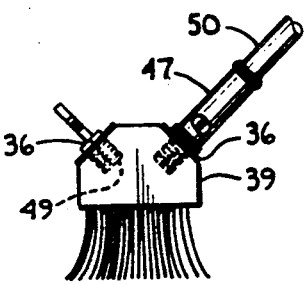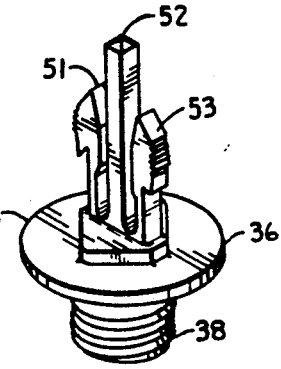

QUICK-RELEASE CONNECTOR FOR MOP HANDLES AND THE LIKE

BACKGROUND OF THE INVENTION

The invention relates to a quick-connect and release connector for attaching, for example, a mop handle to a mop head or the like.

Mops, brooms, paint rollers, etc. conventionally incorporate handles which are removable from the operating head of the implement. It is conventional with brooms and paint rollers at least, to use a threaded connector between the handle and the implement head. Mops, on the other hand, due to the fact that the mop head wears out long before the handle, have long used various types of connection mechanisms to connect the mop head with the handle. Quite often these connection mechanisms have employed rivets, bolts, screws, etc. which must be removed and reinstalled when the head is removed from the handle. This tends to be a time-consuming operation and may be beyond the skill level of the typical relatively unskilled worker who uses the mop.

Also the prior connectors between handle and implement have been difficult to align and assemble and prone to excessive wear from the repeated removal and reinstallation of the rivets, bolts, etc. Furthermore, these designs have been unable to withstand the considerable tensile, shear and torsional forces constantly imposed upon, for example a mop head, during typical use.

It is not unusual for an institutional user, such as a hospital, fast food restaurant or the like, to wear out a mop head in as little as a few days. The prior art connection designs have tended to be rather complex, expensive, and have greatly added to the cost, bulk and weight of the typical mop head.

It is clear then, that a simple, reliable, and inexpensive quick-release connector for connecting handles to mop heads, broom heads, paint rollers and the like is needed. It is also clear that such a connector should be simple to operate, able to withstand the considerable stresses placed upon it during mopping, sweeping, etc, and should be economically discardable with the mop head.

SUMMARY OF THE INVENTION

The present invention is a quick-connect and release connector for connecting a handle to a mop head, broom head, paint roller or the like. The connector includes two main elements that are a handle portion and a head portion. The handle portion is a cylindrical member with a circular bore at one end to receive one end of the mop handle and which is permanently affixed thereto by gluing or other permanent connection techniques. The other end of the cylindrical handle portion has a relatively shallow recess adapted to mate with a corresponding protrusion on the head portion.

Within the recess on the handle portion are a plurality of square or rectangular receptacles which mate with corresponding bayonet projections on the head portion. Preferably there are three such square or rectangular receptacles, the center one of which is larger and deeper than the laterally spaced outer two receptacles. The two outside receptacles each connect or mate with a corresponding indentation in the sidewall of the cylindrical handle portion, when the head portion is connected to the handle portion. The head portion includes the three corresponding bayonet projections, with the center one of these bayonets being larger and longer than the two outside bayonets.

Furthermore, the center bayonet is a rigid structure, while the outside two bayonets are flexible. When the two portions are connected together, the center bayonet acts as a guide so that the outside bayonets and the mating protrusion and recess, respectively, are properly oriented to each other. As the two portions are pushed together the outside bayonets are flexed inward until such time as the bayonets are fully received in a respective aperture and an outer surface of each of the outer bayonets aligns with a respective recess in the sidewall of the handle portion. At this point the outside bayonets are resiliently urged outward so as to engage and seat in the recesses in the handle portion to securely lock the two portions together. The result is a quick-release connector for reliably and securely attaching a handle to a mop head or the like.

OBJECTS AND ADVANTAGES OF THE INVENTION

The principal objects of the present invention are: to provide an improved quick-release connector for connecting a handle to a mop head, broom head or the like; to provide such a connector which is quickly connected and released; to provide such a connector that requires no rivets, bolts, screws or similar time consuming fasteners; to provide such a connector which can be easily used by unskilled workers; to provide such a connector which is strong enough to withstand tensile, shear and torsional forces; to provide such a connector which is economically disposable; to provide such a connector which is readily adaptable to several different thicknesses and weights of mops; to provide such a connector which is easily and economically manufacturable; and to provide such a connector which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a connector in accordance with the present invention, shown with a mop head connected to a mop handle.

FIG. 2 is an enlarged and exploded perspective view of the connector.

FIG. 3 is a fragmentary and enlarged side elevational view of the connector and handle, showing a connector head portion partially exploded and with parts broken away to show interior detail.

FIG. 4 is an enlarged and fragmentary side elevational cross-sectional view of the connector, shown assembled without the details of the mop head and showing bayonets of the connector in a locked position, with portions broken away to show details thereof.

FIG. 5 is an enlarged and fragmentary side elevational view of the connector similar to FIG. 4 with one of the bayonets depressed by a user to an unlocked position and with portions broken away to show interior detail.

FIG. 6 is a side elevational view of a mop employing the connector with the connector shown fully assembled.

FIG. 7 is a bottom plan view of a mop head assembled to the head portion of the connector.

FIG. 8 is an enlarged perspective view of a top part of the head portion of the connector in a disassembled state.

FIG. 9 is an enlarged cross-sectional view of the connector, shown assembled and with a mating recess in a handle portion shown in phantom.

FIG. 10 is an enlarged bottom plan view of the handle portion of the connector in a disassembled state.

FIG. 11 is a perspective view of a head portion of a first modified connector having a threaded shaft for mating with a conventional broom handle or the like having a standard acme thread.

FIG. 12 is a reduced scale side elevational view of a broom head connected to a broom handle using the head portion of the connector shown in FIG. 11.

FIG. 13 is a perspective of a head portion of a second modified connector in accordance with the present invention having an annular section to receive a handle extension.

FIG. 14 is a reduced scale side elevational view of an extendable handle employing the connector shown in FIG. 13.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely a s a basis for the claims and as a representative basis for teaching one skilled in the art to variously employ the present invention in virtually any appropriately detailed structure.

Referring to FIG. 1, there is shown a mop head 2 assembled to a mop handle 3 via a quick-release connector 1, in accordance with the present invention.

As illustrated in FIG. 2, the connector 1 has three major separable members that are a handle portion 7 and a head portion 8, comprising elements 9 and 10.

FIGS. 3, 6 and 7 best illustrate the assembly of the two head portion elements 9 and 10 to the mop head 2. FIG. 3 shows a portion of the mop head 2 illustrating three spaced and parallel apertures 13 through the top of the mop head 2. The mop head portion element 9 has three parallel and spaced apertures 14 that are spaced to coincide with the apertures 13. The mop head portion 8 has three parallel and elongate cylindrical pegs or prongs 16 integrally molded therein and extending outwardly therefrom. In assembling the head portion elements 9 and 10 to the mop head 2, the prongs 16 are inserted through the mating apertures 13 the mop head 2 and then through the corresponding apertures 14 in the head portion element 9. The prongs 16 are then permanently seated in the apertures 14 via ultrasonic welding by swagging the distal end of each prong 16 to be larger than the apertures 13 and 14 or other permanent bonding techniques. FIGS. 6 and 7 illustrate the completed mop head 2.

The complete mop head 2 is then easily and quickly connectable to the mop handle 3 by inserting three elongate projections or bayonets 19, 20 and 21 into three corresponding respective bayonet receiver receptacles 22, 23 and 24 in the handle portion 7. The outer bayonets 19 and 21 are relatively thin and flexible, and, as the handle portion 7 is pushed onto the head portion 8, the outer bayonets 19 and 21 flex inwardly to permit the two connector portions 7 and 8 to be pushed together by a user.

As best illustrated in FIG. 4, the head portion 7 has two slots or indentations 28 and 29 located in a cylindrical sidewall 27 thereof. The indentations 28 and 29 connect with and open into respective bayonet receptacles 22 and 24, and are positioned so as to permit the flexible bayonets 19 and 21 to be urged outwardly into the indentations 28 and 29 by the natural resiliency of the bayonets 19 and 21 once the two portions 7 and 8 are pushed far enough together into a locked and operational configuration.

The bayonets 19 and 21 have shoulders or ledges 30 and 31 and radially outwardly extending knurled surfaces 34 and 35 molded therein. Again, as illustrated in FIG. 4, once the connector portions 7 and 8 are pushed together, the ledges 30 and 31 overlap and mate with the lower sides of the indentations 28 and 29, respectively, as the flexible bayonets 19 and 21 are resiliently urged outwardly. This provides a positive locking feature so that the portions 7 and 8 are kept securely fastened together.

FIG. 5 illustrates how to separate the two portions 7 and 8 by a release technique wherein an operator aligns a finger with the indentation 28, contacting the knurled surface 34 of the flexible bayonet 19, urging the bayonet 19 inward while simultaneously doing likewise to the bayonet 21 so that the bayonet leges 30 and 31 clear the sides of the indentations 28 and 29 and are fully within the receptacles 22 and 24 respectively such that the portions 7 and 8 can be easily pulled apart by sliding the bayonets 19 and 21 along the receptacles 22 and 24 respectively. The knurled surface 34 provides an antislip function for the operator's finger.

The bayonet 20 is rigid and significantly larger and longer than the flexible bayonets 19 and 21. Thus, the insertion of the rigid bayonet 20 into the bayonet receptacle 23, which is wider and deeper than the other receptacles 22 and 24, acts to properly orient and guide the flexible bayonets 19 and 21 into their respective receptacles 22 and 24. The rigid bayonet 20 also adds considerable strength and rigidity to the assembled structure.

Another important feature of the connector 1 is illustrated in FIGS. 2, 8, 9 and 10. As shown in FIG. 2, the handle portion 7 has incorporated on its bottom surface a diamond-shaped recess 32. The head portion 8, as best illustrated in FIG. 8, has a matching diamond-shaped protrusion 33. When the handle portion 7 is assembled to the head portion 8, the protrusion 33 is received into the recess 32. This is illustrated in FIG. 9 where the periphery of the recess 32 and the protrusion 33 are shown in phantom lines. This mating of the protrusion 33 with the recess 32 substantially adds to the strength and rigidity of the structure, particularly in resisting the considerable torsional stresses that are imposed on the mop head 2 during use. Note that during assembly, the rigid bayonet 20 and the bayonet receptacle 23 also act as guides for the mating of the protrusion 33 with the recess 32.

FIGS. 11 and 12 illustrate another embodiment of the quick-release connector head portion generally represented by the reference numeral 36 that has an axially depending projection 38 that incorporates standard acme threads for mating with a broom head 39, although it is foreseen that the connector 36 may be used in conjunction with a paint roller or the like. In this embodiment, a handle portion 47 would be generally the same as the handle portion of the previous embodiment and as shown in FIGS. 1 through 10, with only a head portion 48 modified. The head portion 48, rather than incorporating the three prongs of the previous embodiment, has molded therein the threaded projection 38.

FIG. 12 illustrates one use for the connector embodiment of FIG. 11 where two of the head portions 48 are threaded into the female threaded receptacles 49 of the standard push-broom head 39. A broom handle 50 incorporating a connector head portion 47 can at the desire of the user be rapidly connected to either side of the broom head 39. This also serves to eliminate the annoying instances of wooden broom handles snapping off and leaving their threaded portions embedded in broom heads and other implements. The connector embodiment illustrated in FIG. 11 can also be used with standard paint rollers, asphalt driveway brushes, and any other implement which incorporates standard acme threads as a connector. Bayonets 51, 52 and 53 extend from the head portion 48 opposite the threaded projection 38.

It is foreseen that the connector 36 can also be used as a part of a modular tool component system. It is well known that long-handled tools such as brooms, rakes, shovels, hoes, tree saws and the like can occupy a large amount of space within a garage or storage shed. The working implement heads of a plurality of such long-handled tools could be fitted with the head portion 48 of the connector 36 as is illustrated in FIG. 11, and a single handle equipped with a mating handle portion 47, as is illustrated in FIG. 12, could be used with all of the tools. This would substantially reduce the storage requirements of these tools. It is possible that a plurality of such tools could be packaged and marketed as a set, possibly fitted to a complimentary bracket for mounting on a wall, and complete with one or more modular handles.

FIGS. 13 and 14 illustrate a third embodiment of a quick-release connector generally designated by the reference numeral 80. FIG. 13 illustrates a male connector handle portion 81 of the connector 80 which is designed to mate with a female connector handle portion 82 of the type such as is illustrated in greater detail in FIGS. 1 through 10. This embodiment is generally similar to the embodiment of FIG. 11, except that the threaded projection of the prior embodiment is replaced with a hollowed cylindrical extension 85 which has a circular bore 86 to accommodate another handle section 88. FIG. 14 shows how the male handle portion 81 mates with the female handle portion 82 to create an extendable handle 90 for use with ceiling paint rollers and similar implements which require longer than normal handles. The considerable strength and rigidity of this connector is highly advantageous in creating a lengthy extension handle.

Preferably the connectors of the present invention are constructed of nylon which possesses a high strength-to-weight ratio and is readily bondable by conventional ultrasonic welding techniques. It is foreseen that other thermoset resins or the like may be used with equal effectiveness. Such materials are readily molded into the desired shapes and are economical enough to permit their disposal with used mop heads and the like.

While quick-connectors described herein have been described as usable with a mop or broom, it should be apparent that such could be used in any device requiring connection between two elements such as belts, wires, straps, etc. Furthermore, it is seen that the prongs may be sharpened to penetrate mop heads or other implements which do not incorporate mating apertures. The connector device of the present invention is readily adaptable to different weights and thicknesses of mop heads or other implements merely by changing the diameter and thickness of the connector portions.

It is to be understood that while certain forms of the present invention have been illustrated and described herein, it is not to be limited to the specific forms or arrangement of parts described and shown.

What is claimed and desired to be secured by Letters Patent is as follows:

1. A quick-release connector apparatus for connecting a handle to a working head, the connector apparatus comprising:
   (a) a cylindrical handle portion adapted to be joined with the handle at one end thereof and a plurality of receptacles at the other end with at least one indentation in a side wall of said handle portion that opens into a respective one of said receptacles; and
   (b) a head portion releasably mateable with said handle portion, said head portion comprising a plurality of bayonet projections arranged to mate with respective ones of said plurality of receptacles in said handle portion, at least one of said bayonet projections being flexible and including a gripping ledge such that, when said handle and head portions are fully joined together, said flexible bayonet projection is urged outwardly so that said gripping ledge overlaps a side of said indentation to securely fasten said handle and head portions together; said head portion includes:
      (1) a first section including said plurality of bayonet projections on a top side thereof and a plurality of projecting studs on a bottom side thereof; and
      (2) a second section which includes a plurality of through-apertures arranged to receive respective ones of said plurality of studs, wherein said first section and said second section are permanently affixed to the working head by inserting said studs through the working head, placing said second section over said studs and securing said studs to said second section.

2. The quick-release connector apparatus in accordance with claim 1, wherein:
   (a) said studs and said second section are bonded by using ultrasonic welding techniques.

3. The quick-release connector apparatus in accordance with claim 1, wherein:
   (a) said first and second sections are disk shaped.

4. The quick-release connector apparatus in accordance with claim 1 further comprising a mop head connected to said quick-release connector apparatus between said first section of said head portion and said second section of said head portion.

5. The quick-release connector apparatus in accordance with claim 1 further comprising a handle connected to said cylindrical handle portion of said quick-release connector apparatus.

6. The quick-release connector apparatus in accordance with claim 1 further comprising a mop head connected to said quick-release connector apparatus between said first section of said head portion and said second section of said head portion and a handle connected to said cylindrical handle portion of said quick-release connector apparatus.

* * * * *